J. S. EVERITT & C. H. AVERY,

Said EVERITT Assignor to J. A. MILLER, and said AVERY & MILLER assignors of one-fourth interest to J. G. FLANDERS and E. H. BOTTUM.

Head-Block for Saw-Mills.

No. 9,217. Reissued May 25, 1880.

WITNESSES

F. L. Durand.

H. A. Toulmin.

INVENTOR

John S. Everitt

Charles H. Avery by F. W. Ritter Jr. asso. ATTORNEY

N. PETERS, PHOTO-LITHOGRAPHER, WASHINGTON, D. C.

UNITED STATES PATENT OFFICE.

JOHN S. EVERITT AND CHARLES H. AVERY, OF OSHKOSH, WISCONSIN; SAID EVERITT ASSIGNOR TO JOHN A. MILLER, OF SAME PLACE, AND SAID AVERY AND MILLER ASSIGNORS OF ONE-FOURTH INTEREST TO JAMES G. FLANDERS AND ELIAS H. BOTTUM, OF MILWAUKEE, WIS.

HEAD-BLOCK FOR SAW-MILLS.

SPECIFICATION forming part of Reissued Letters Patent No. 9,217, dated May 25, 1880.

Original No. 112,572, dated March 14, 1871. Application for reissue filed June 9, 1879.

*To all whom it may concern:*

Be it known that we, JOHN S. EVERITT and CHARLES H. AVERY, of Oshkosh, in the county of Winnebago and State of Wisconsin, have invented certain new and useful Improvements in Saw-Mill Dogs; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Our invention relates to that class of saw-mill dogs which are connected to the knee or standard of a saw-mill carriage and serve to hold a log or cant firmly against the standard while the same is being sawed into planks or boards; and it consists in arranging or setting the bits of a set of dogs connected by a series of levers so as to be operated simultaneously in such manner that one or more of the bits shall enter or seize the log or cant in reverse direction from the remainder of the dogs; and, also, in details of construction hereinafter more specifically set forth.

Figure 1:
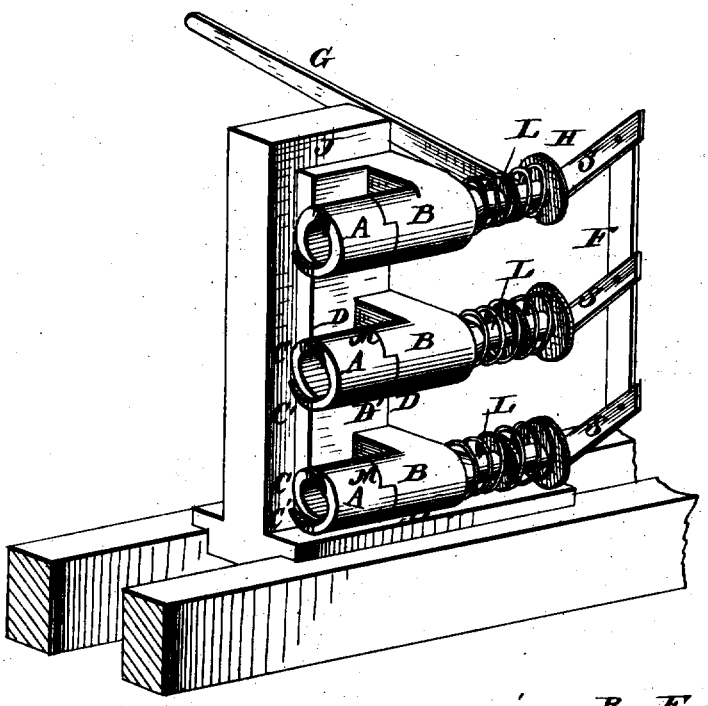
Figure 4:
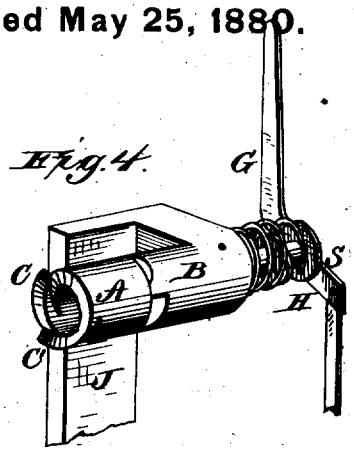
Figure 2:
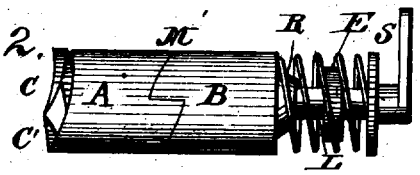
Figure 3:
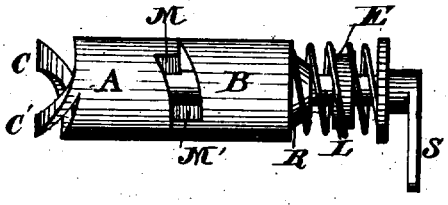
Figure 5:
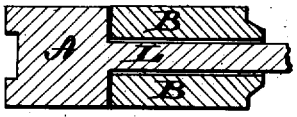

In the drawings, Figure 1 is a perspective view of the standard to which our improved dogs are attached. Figs. 2, 3, and 4 are views of one of my improved dogs in various positions. Fig. 5 is a sectional detail view of a dog and its journal-box, a portion of the shaft of the dog being broken off.

A are the dogs, each of which has a shaft, L, which passes through bearings B, cast usually with the bed-piece, by which the set of dogs are connected to the knee or standard J. Both faces of the dogs are shouldered and inclined, and the face of each next to the saw is armed with steel griping-points C C′. The inclines D′ on the other faces are opposed to similar ones, D, on the journal-box B, and work upon them, and the dogs have shoulders M, which abut against shoulders M′ on the said journal-box.

The dog-blades have a greater inclination forward than that on the face of the journal-box, which gives them a tendency to work into the log independent of the driving-incline on the journal-box.

The shaft L, passing through the journal-box, is surrounded by a spiral spring, which has a bearing on the box B, and a washer which rests against a lever-arm, *s′*, on the journal of each dog.

Upon shaft L is a collar, E. The use of the collar E is this, that when the shaft is turned and the collar E bears against the end of the journal-box further pressure on the lever drives the dogs farther into the log and draws it snugly against the standard J.

The topmost lever is of the elbow form, and to its short arm *s* has pivoted a bar, F, which, in turn, is pivoted to and connects the other levers *s s*.

Operation: When the dogs are in position on the standard and the log or cant is on the ways, power applied to the long arm *g* of the lever H is communicated to the lever-arms *s s* and the dogs are revolved. In their revolution they are thrust out by their inclined ways riding upon those on the journal-box. The hooks or bits C C′ will enter the log or cant, and will hold it firmly in position. To release the log or cant, the lever is operated in an opposite direction, the teeth are unlocked, and the springs draw the dogs out of the log.

By this arrangement it will be seen that when the hooks or bits C C′ first engage the log they are both very nearly in line, so that while one moves in a general downward direction into the log its companion will move in a general upward direction, and hence the two will oppose each other and grasp the log between them.

By connecting three or more independent dogs, as above described, a log or cant may be grasped at various points simultaneously by a single movement of the lever H, and in a like manner released.

By giving the dogs fixed pivotal bearings on the standard J and connecting them by a series of levers, they can be easily and quickly operated to seize or release a cant and readily return to their first position to receive a second cant when the first has been discharged. Furthermore, the bearings being fixed pivotal bearings, the constant tendency of the bits or hooks while seizing and holding a cant is to draw or hug the same to the standard, thus insuring the steadiness and firmness of the support given to the cant.

We claim—

1. The combination, with the knee or standard of a saw-mill carriage, of a series of dogs pivoted or journaled thereon, each dog having a hook, bit, or griper, and a series of levers for operating the dogs simultaneously, the bits, hooks, or gripers of the dogs being set so that a griper or hook of one dog of the series shall enter the cant or log in a different direction from a like bit or hook upon another dog of the series, substantially as and for the purpose specified.

2. The rotating dog A, provided with auger-blades, and having a shaft by which it is operated.

3. The rotating dogs having inclined faces and shoulders and a rotating shaft, in combination with the journal-box having corresponding inclined faces and shoulders, as set forth.

In testimony that we claim the foregoing as our own we affix our signatures in presence of two witnesses.

JNO. S. EVERITT.
CHARLES H. AVERY.

Witnesses:
H. B. JACKSON,
CHAS. R. NEVITT, Jr.